United States Patent
Morgan et al.

(10) Patent No.: US 11,767,978 B2
(45) Date of Patent: Sep. 26, 2023

(54) CARTRIDGE TIP FOR TURBOMACHINE COMBUSTOR

(71) Applicant: General Electric Company, Schenectady, NY (US)

(72) Inventors: Dana Morgan, Greenville, SC (US); Lucas John Stoia, Taylors, SC (US); Elizabeth Leigh Exley, Greenville, SC (US); Mohan Krishna Bobba, Greenville, SC (US); Netaji Haribhau Mane, Bangalore (IN); John Bryan Pourcho, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/382,458

(22) Filed: Jul. 22, 2021

(65) Prior Publication Data
US 2023/0022306 A1    Jan. 26, 2023

(51) Int. Cl.
| | | |
|---|---|---|
| F23R 3/34 | (2006.01) | |
| F02C 7/24 | (2006.01) | |
| F23C 1/08 | (2006.01) | |
| F23D 11/38 | (2006.01) | |
| F23D 17/00 | (2006.01) | |
| F23R 3/36 | (2006.01) | |

(52) U.S. Cl.
CPC ............. *F23R 3/343* (2013.01); *F02C 7/24* (2013.01); *F05D 2260/231* (2013.01); *F23C 1/08* (2013.01); *F23D 11/38* (2013.01); *F23D 17/002* (2013.01); *F23R 3/36* (2013.01)

(58) Field of Classification Search
CPC ................................ F23R 3/343; F23R 3/283
See application file for complete search history.

(56) References Cited

U.S. PATENT DOCUMENTS

| 5,408,825 | A | 4/1995 | Foss et al. |
|---|---|---|---|
| 9,383,107 | B2 | 7/2016 | Shershnyov et al. |
| 9,964,043 | B2 | 5/2018 | Myers et al. |
| 10,006,636 | B2 | 6/2018 | Ginessin et al. |
| 10,578,306 | B2 | 3/2020 | Purcell et al. |
| 10,655,858 | B2 | 5/2020 | Bailey et al. |
| 10,731,862 | B2 | 8/2020 | Shershnyov et al. |
| 10,982,593 | B2 | 4/2021 | Chila et al. |

(Continued)

OTHER PUBLICATIONS

Examiner Inuials.

*Primary Examiner* — Katheryn A Malatek
*Assistant Examiner* — Alyson Joan Harrington
(74) *Attorney, Agent, or Firm* — Dority & Manning, P.A.

(57) ABSTRACT

A cartridge tip includes a main body having an outer annular wall and an inner core each extending between a respective upstream end and a respective downstream end. The inner core is radially spaced apart from the outer annular wall such that an annular air passage is defined at least partially between the outer annular wall and the inner core. A pilot fuel circuit extends between a pilot inlet defined in the upstream end of the inner core and a pilot outlet defined in a downstream end of the inner core. The pilot fuel circuit extends at least partially along an axial centerline of the cartridge tip. A main fuel circuit extends between a main inlet in the upstream end of the inner core and a plurality of main outlets circumferentially spaced apart from one another and disposed upstream from the from the pilot outlet.

18 Claims, 7 Drawing Sheets

(56) References Cited

U.S. PATENT DOCUMENTS

| | | | |
|---|---|---|---|
| 2005/0000227 A1* | 1/2005 | McCaffrey | F23R 3/343 |
| | | | 60/752 |
| 2010/0263382 A1 | 10/2010 | Mancini et al. | |
| 2012/0031098 A1* | 2/2012 | Ginessin | F23R 3/283 |
| | | | 60/740 |
| 2017/0082290 A1 | 3/2017 | Stewart | |
| 2018/0363910 A1 | 12/2018 | Stoia et al. | |
| 2020/0208841 A1* | 7/2020 | Chabaille | F23R 3/28 |

* cited by examiner

CARTRIDGE TIP FOR TURBOMACHINE COMBUSTOR

FIELD

The present disclosure relates generally to a cartridge tip for use in a turbomachine. Particularly, the present disclosure relates to a liquid fuel cartridge tip having structure that reduces operational thermal stresses.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Generally, the combustion section includes one or more fuel nozzles for mixing and injecting gaseous fuel and air into a combustion chamber. Additionally, the combustion section often includes one or more liquid fuel cartridges for mixing and injecting a separate stream of liquid fuel and air into the combustion section, such that the combustion section may operate only with gaseous fuel, only with liquid fuel or simultaneously with gaseous fuel and liquid fuel. In many cases, a power plant can experience long periods of time requiring it to run on liquid fuel only.

Liquid fuel cartridges often include liquid fuel cartridge tips or pilot tips having complex geometries that increase the efficiency of the combustion section. For example, liquid fuel cartridge tips often include multiple injection outlets and premixing chambers that result in richer and more complete burning of the liquid fuel and air within the combustion section.

However, issues exist with the use of many know cartridge tips. For example, transient and steady state thermal stresses can arise within the cartridge tip during liquid fuel operation that can damage the component over time. Thus, an improved cartridge tip is desired in the art. Particularly, an improved cartridge tip, that is capable of having multiple injection outlets and premixing functions without being susceptible to damaging thermal stresses, is desired.

BRIEF DESCRIPTION

Aspects and advantages of the cartridge tips and turbomachines in accordance with the present disclosure will be set forth in part in the following description, or may be obvious from the description, or may be learned through practice of the technology.

In accordance with one embodiment, a cartridge tip is provided. The cartridge tip includes a main body having an outer annular wall and an inner core each extending between a respective upstream end and a respective downstream end. The inner core is radially spaced apart from the outer annular wall such that an annular air passage is defined at least partially between the outer annular wall and the inner core. A pilot fuel circuit defined in the inner core of the main body. The pilot fuel circuit extends between a pilot inlet defined in the upstream end of the inner core and a pilot outlet defined in a downstream end of the inner core. The pilot fuel circuit extends at least partially along an axial centerline of the cartridge tip. A main fuel circuit is defined in the inner core of the main body. The main fuel circuit extends between a main inlet in the upstream end of the inner core and a plurality of main outlets circumferentially spaced apart from one another and disposed upstream from the from the pilot outlet.

In accordance with another embodiment, a combustor is provided. The combustor includes an end cover. A combustion liner defines a combustion chamber. A plurality of fuel nozzles extend between the end cover and the combustion liner. At least one liquid fuel cartridge extends through a fuel nozzle of the plurality of fuel nozzles to a cartridge tip. The cartridge tip includes a main body having an outer annular wall and an inner core each extending between a respective upstream end and a respective downstream end. The inner core is radially spaced apart from the outer annular wall such that an annular air passage is defined at least partially between the outer annular wall and the inner core. A pilot fuel circuit defined in the inner core of the main body. The pilot fuel circuit extends between a pilot inlet defined in the upstream end of the inner core and a pilot outlet defined in a downstream end of the inner core. The pilot fuel circuit extends at least partially along an axial centerline of the cartridge tip. A main fuel circuit is defined in the inner core of the main body. The main fuel circuit extends between a main inlet in the upstream end of the inner core and a plurality of main outlets circumferentially spaced apart from one another and disposed upstream from the from the pilot outlet.

These and other features, aspects and advantages of the present cartridge tips and combustors will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present cartridge tips and turbomachines, including the best mode of making and using the present systems and methods, directed to one of ordinary skill in the art, is set forth in the specification, which makes reference to the appended figures, in which.

DETAILED DESCRIPTION

Figure 1:
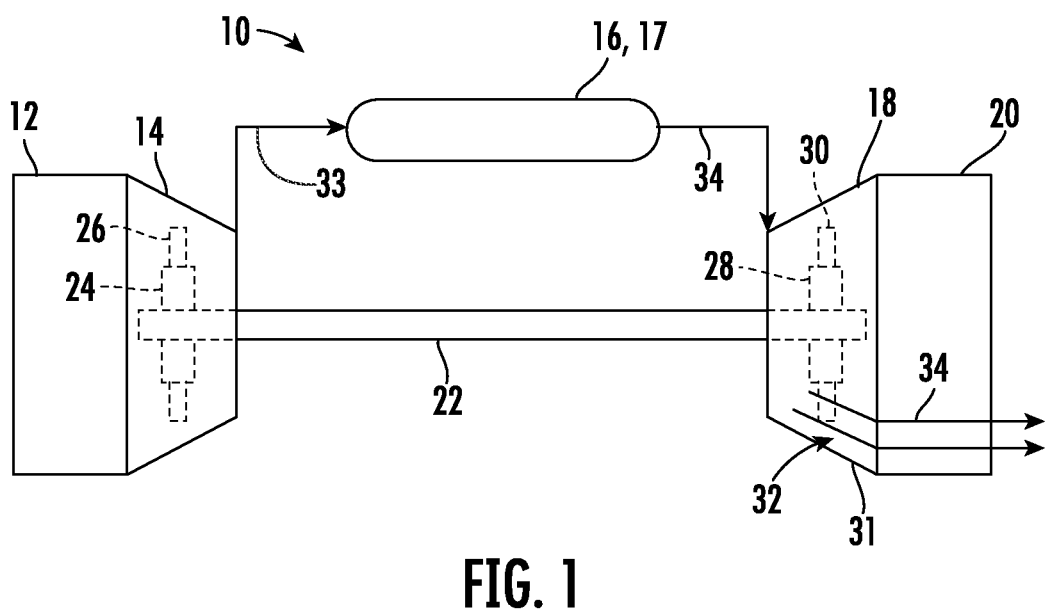
FIG. 1 is a schematic illustration of a turbomachine, in accordance with embodiments of the present disclosure.

Reference now will be made in detail to embodiments of the present cartridge tips and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

The singular forms "a", "an", and "the" include plural references unless the context clearly dictates otherwise.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, or refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors 17 (FIG. 2) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized or compressed air 33 to the combustors of the combustor section 16. The compressed air 33 is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
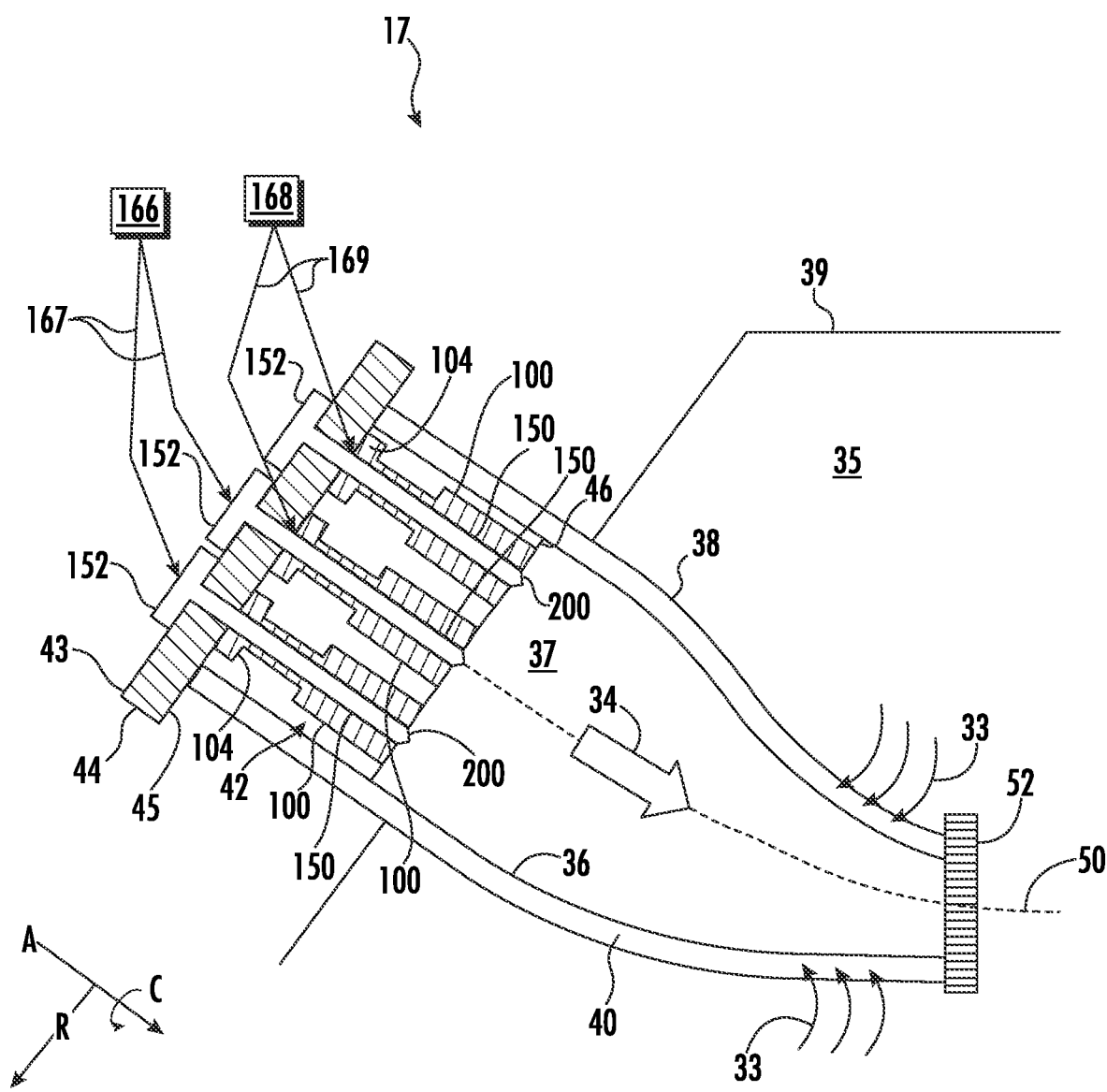
FIG. 2 illustrates a cross sectional view of a combustor, in accordance with embodiments of the present disclosure.

FIG. 2 illustrates a cross sectional view of a combustor 17 in the plurality of combustors 17, in accordance with embodiments of the present disclosure. As shown, the combustor 17 defines a cylindrical coordinate system. For example, the combustor 17 defines an axial direction A, a radial direction R, and a circumferential direction C. In general, the axial direction A extends parallel to an axial centerline 50 of the combustor 17, the radial direction R extends generally orthogonal to the axial centerline 50, and the circumferential direction C extends generally concentrically around the axial centerline 50.

As shown, the combustor 17 includes a liner 36 that contains and conveys combustion gases 34 to the turbine. The liner 36 may define a combustion chamber 37 within which combustion occurs. The liner 36 may have a cylindrical liner portion and a tapered transition portion that is separate from the cylindrical liner portion, as in many conventional combustion systems. Alternately, the liner 36 may have a unified body (or "unibody") construction, in which the cylindrical portion and the tapered portion are integrated with one another. Thus, any discussion herein of the liner 36 is intended to encompass both conventional combustion systems having a separate liner and transition piece and those combustion systems having a unibody liner. Moreover, the present disclosure is equally applicable to those combustion systems in which the transition piece and the stage one nozzle of the turbine are integrated into a single unit, sometimes referred to as a "transition nozzle" or an "integrated exit piece."

In many embodiments, the liner 36 may be surrounded by an outer sleeve 38, which is spaced radially outward of the liner 36 to define an annulus 40 between the liner 36 and the outer sleeve 38. The outer sleeve 38 may include a flow sleeve portion at the forward end and an impingement sleeve portion at the aft end, as in many conventional combustion systems. Alternately, the outer sleeve 38 may have a unified body (or "unisleeve") construction, in which the flow sleeve portion and the impingement sleeve portion are integrated with one another in the axial direction. As before, any discussion herein of the outer sleeve 38 is intended to encompass both conventional combustion systems having a separate flow sleeve and impingement sleeve and combustion systems having a unisleeve outer sleeve.

The combustor 17 may further include a head end portion 42 that is located upstream from the combustion zone and that surrounds a plurality of fuel nozzles 100 (e.g. circumferentially arranged outer fuel nozzles that surround a center fuel nozzle). For example, the head end portion 42 may be defined between an end cover 44 and a cap plate 46 of the combustor 17. The end cover 44 may generally cover the forward end of the combustor 17 and may include a forward surface 43 and an aft surface 45.

In many embodiments, a plurality of fuel nozzles 100 may include outer fuel nozzles circumferentially spaced apart from one another and surrounding a center fuel nozzle within the head end portion 42. The fuel nozzles 100 may each extend between the end cover 44 and the cap plate 46. For example, the fuel nozzles 100 may each extend from a respective flange 104 coupled to the aft surface 45 of the end cover 44, through the cap plate 46, to a respective outlet disposed in the combustion chamber 37. As described below, the fuel nozzles 100 shown in FIG. 2 may be swirler fuel nozzles, bundled tube fuel nozzles, or any other suitable fuel nozzle.

In exemplary embodiments, the combustor 17 may include one or more liquid fuel cartridges 150 (e.g. an outer liquid fuel cartridge and/or a center liquid fuel cartridge). For example, the one or more liquid fuel cartridges 150 may be at least partially disposed within the head end portion 42 of the combustor 17. In particular, each liquid fuel cartridge 150 in the one or more liquid fuel cartridges 150 may extend through a respective fuel nozzle 100, such that the ratio of fuel nozzles 100 to liquid fuel cartridges 150 is 1:1. In other embodiments, the ratio of fuel nozzles 100 to liquid fuel cartridges 150 may be greater than or less than 1 (such that there may be more fuel nozzles than liquid fuel cartridges or vice versa). In many embodiments, each liquid fuel cartridge 150 may extend coaxially with a respective fuel nozzle 100.

In many embodiments, each liquid fuel cartridge 150 of the one or more liquid fuel cartridges 150 may extend from a respective flange 152 coupled to the end cover 44, through a respective fuel nozzle 100 of the plurality of fuel nozzles 100, to a cartridge tip 200. For example, the flange 152 of the liquid fuel cartridge 150 may couple to the forward surface 43 of the end cover 44 (opposite the flange 104 of the fuel nozzles 100). As discussed further below, cartridge tip 200 may be configured to inject liquid fuel within the combustion chamber 37.

As shown in FIG. 2, the liquid fuel cartridge(s) 150 may be fluidly coupled to a liquid fuel supply 166, such that the liquid fuel cartridges convey liquid fuel through the head end portion 42 to the combustion chamber 37. As shown, the liquid fuel supply 166 may be fluidly coupled to the liquid fuel cartridges 150 via a liquid fuel supply line 167. In many embodiments, the pure liquid fuel may be supplied from the liquid fuel supply 166 to the liquid fuel cartridges 150 and/or 156 for injection into the combustion chamber 37. In other embodiments, the liquid fuel cartridges 150 and/or 156 may be supplied with a liquid fuel mixture (such as a mixture of pure liquid fuel and water) from the liquid fuel supply 166. The liquid fuel mixture may originate from a liquid fuel supply system (such as a mixing tank) within which liquid fuel and water are mixed and delivered to the liquid fuel cartridges 150 via the liquid fuel supply line 167. As discussed below in more detail, the cartridge tip 200 described herein may include one or more fluid circuits, each of which may be operable to receive a separate supply of fuel from the liquid fuel supply 166. For example, a first fluid circuit of the cartridge tip 200 may be operable to receive a flow of pure fuel from the liquid fuel supply 166, while a second fuel circuit may be operable to separately receive a flow of liquid fuel and water (or vice versa).

In many embodiments, as shown in FIG. 2, the fuel nozzles 100 may be fluidly coupled to a gaseous fuel supply 168 via a gaseous fuel supply line 169. In this way, each of the fuel nozzles 100 may be in fluid communication with the gaseous fuel supply 168, such that the fuel nozzles 100 convey gaseous fuel from the gaseous fuel supply 168, through the head end portion 42, to the combustion chamber 37. The gaseous fuel may be mixed with compressed air 33 within the fuel nozzles 100 prior to injection into the combustion chamber 37 by the fuel nozzles 100. The fuel nozzles 100 may be swirler fuel nozzles bundled tube fuel nozzles or any other suitable fuel nozzle.

In many embodiments, the combustor 17 may be at least partially surrounded by a forward casing 39 such as a compressor discharge casing. The forward casing 39 may at least partially define a high-pressure plenum 35 that at least partially surrounds various components of the combustor 17. The high-pressure plenum 35 may be in fluid communication with the compressor section 14 (FIG. 1) so as to receive compressed air 33 therefrom. In various embodiments, the forward casing 39 may be fluidly connected to an outlet of the compressor section 14. Compressed air 33 may flow from the high-pressure plenum 35 into the annulus 40 at an aft end of the combustor 17, via openings defined in the outer sleeve 38. Because the annulus 40 is fluidly coupled to the head end portion 42, the compressed air 33 travels upstream from the aft end of the combustor 17 to the head end portion 42, where the compressed air 33 reverses direction and enters the fuel nozzles 100. For example, the air 33 may travel through the annulus 40 in the opposite direction of the combustion gases 34 within the liner 36.

The combustion gases 34, which are produced by combusting gaseous fuel and/or liquid fuel with compressed air 33, travel downstream toward an aft frame 52 of the combustor 17, the aft frame 52 representing an aft end of the combustor 17. In many embodiments, the aft frame 52 may be connected to the turbine section 18, such that the combustion gases 34 may exit the combustor 17 at the aft frame 52 and enter the turbine section 18.

Figure 3:
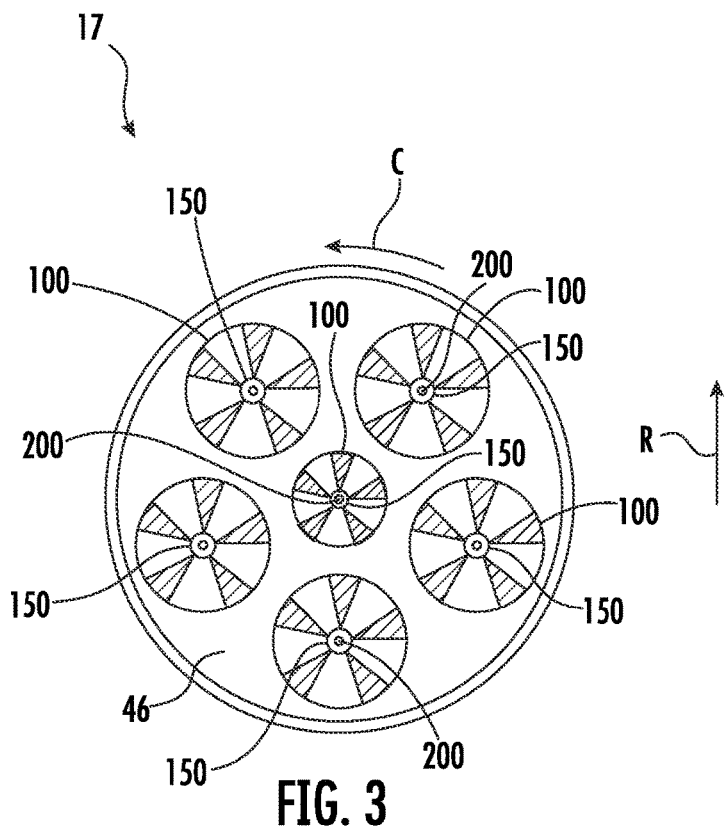
FIG. 3 illustrates a cross-sectional view of a combustor from within the combustion chamber, in accordance with embodiments of the present disclosure.

FIG. 3 illustrates cross-sectional views of a combustor 17 from within the combustion chamber 37. As shown, the liquid fuel cartridges 150 may be installed coaxially with the plurality of fuel nozzles 100. Although six fuel nozzles 100 are shown (e.g. five outer fuel nozzles and one center fuel nozzle), it should be understood that other numbers of fuel nozzles 100 may be employed (such as 4, 6, 8, or 10 fuel nozzles 100). Each of the fuel nozzles 100 and the liquid fuel cartridges 150 may extend through a respective opening defined in the cap plate 46 and into the combustion chamber 37.

As should be appreciated, the combustor 17 may include any type of fuel nozzle 100. For example, although a swirling fuel nozzle or "swozzle" is shown in FIG. 3, the combustor 17 may also employ bundled tube fuel nozzles or other suitable fuel nozzles.

As shown in FIG. 3, each fuel nozzle 100 may include a corresponding liquid fuel cartridge 150 extending coaxially therethrough. In such embodiments, both the outer fuel nozzles and the center fuel nozzle may include a respective liquid fuel cartridge 150 extending therethrough. However, in other embodiments only the center fuel nozzle may include a liquid fuel cartridge 150 extending therethrough, such that the liquid fuel cartridge 150 may be a singular liquid fuel cartridge that extends coaxially with both the center fuel nozzle and the combustor 17. In yet still further embodiments, only one or more of the outer fuel nozzles may include a liquid fuel cartridge extending therethrough, such that the center fuel nozzle does not include a liquid fuel cartridge in some embodiments.

Figure 4:
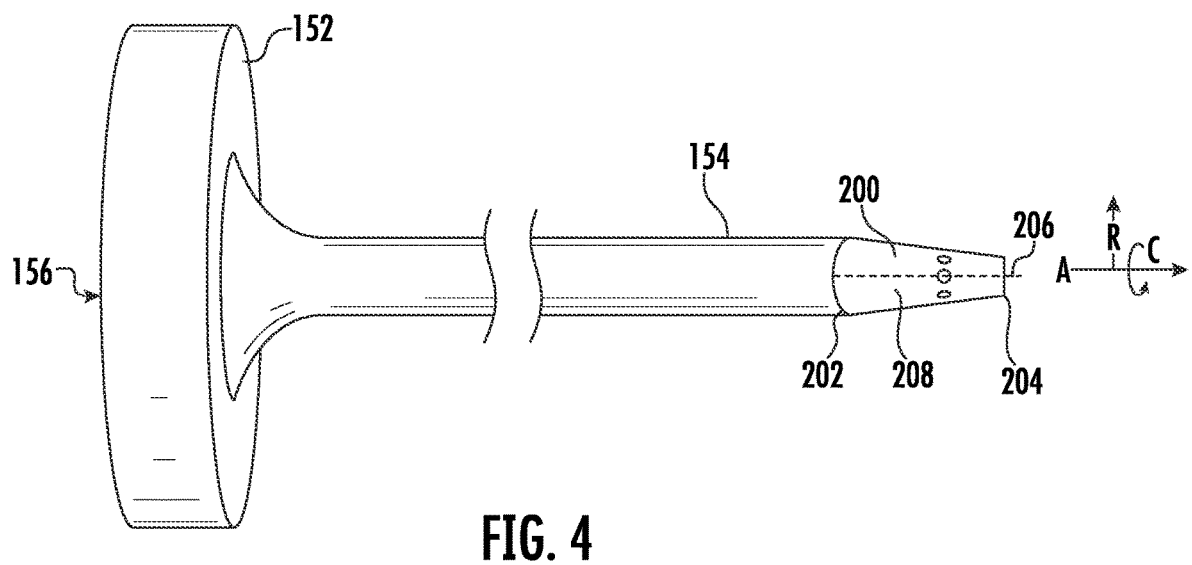
FIG. 4 illustrates a liquid fuel cartridge having cartridge tip, in accordance with embodiments of the present disclosure.

FIG. 4 illustrates a liquid fuel cartridge 150 having a cartridge tip 200, in accordance with embodiments of the present disclosure. As shown, the liquid fuel cartridge 150 may include a flange 152, a body 154, and a cartridge tip 200. The flange 152 may define an inlet 156 that receives the liquid fuel (or a liquid fuel and water mixture) from the liquid fuel supply 166 (FIG. 2). As discussed above, the flange 152 may couple the liquid fuel cartridge 150 to the end cover 44 (such as the forward surface 43 of the end cover 44). The body 154 of the liquid fuel cartridges may extend from the flange 152, through a respective fuel nozzle 100 (FIG. 2), to cartridge tip 200. In many embodiments, the body 154 of the liquid fuel cartridge may be generally cylindrical.

In various embodiments, the cartridge tip 200 may each extend directly from the body 154 of the liquid fuel cartridge 150. The cartridge tip 200 may be positioned either partially or entirely within the combustion chamber 37 (FIG. 2). In particular embodiments, the cartridge tip 200 may extend axially from a base 202 coupled to the body 154 of the liquid fuel cartridge to a tip 204. In this way, the base 202 may be the axially innermost portion of the cartridge tip 200, and the tip may be the axially outermost portion of the cartridge tip 200.

The cartridge tip 200 may generally converge radially inward from the base 202 to the tip 204. In various embodiments, as shown best in FIG. 2, the cartridge tip 200 may be disposed entirely within the combustion chamber 37 and terminate at the tip 204, which is positioned downstream from the cap plate 46. In many embodiments, the cartridge tip 200 may define an axial centerline 206, which may be generally parallel to the axial centerline 50 of the combustor 17 (shown in FIG. 2).

Figure 5:
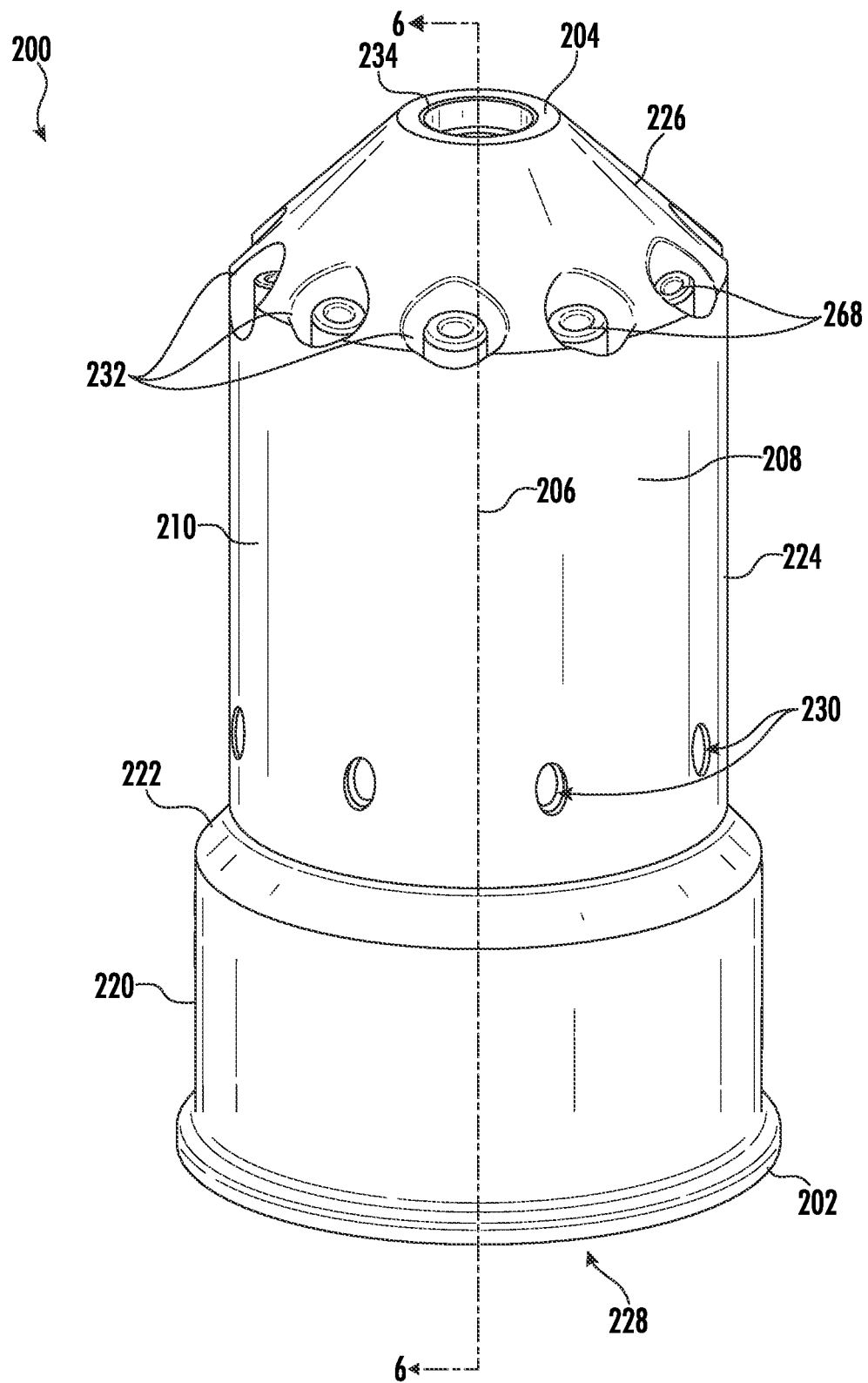
FIG. 5 illustrates a perspective view of a cartridge tip, in accordance with embodiments of the present disclosure.
Figure 6:
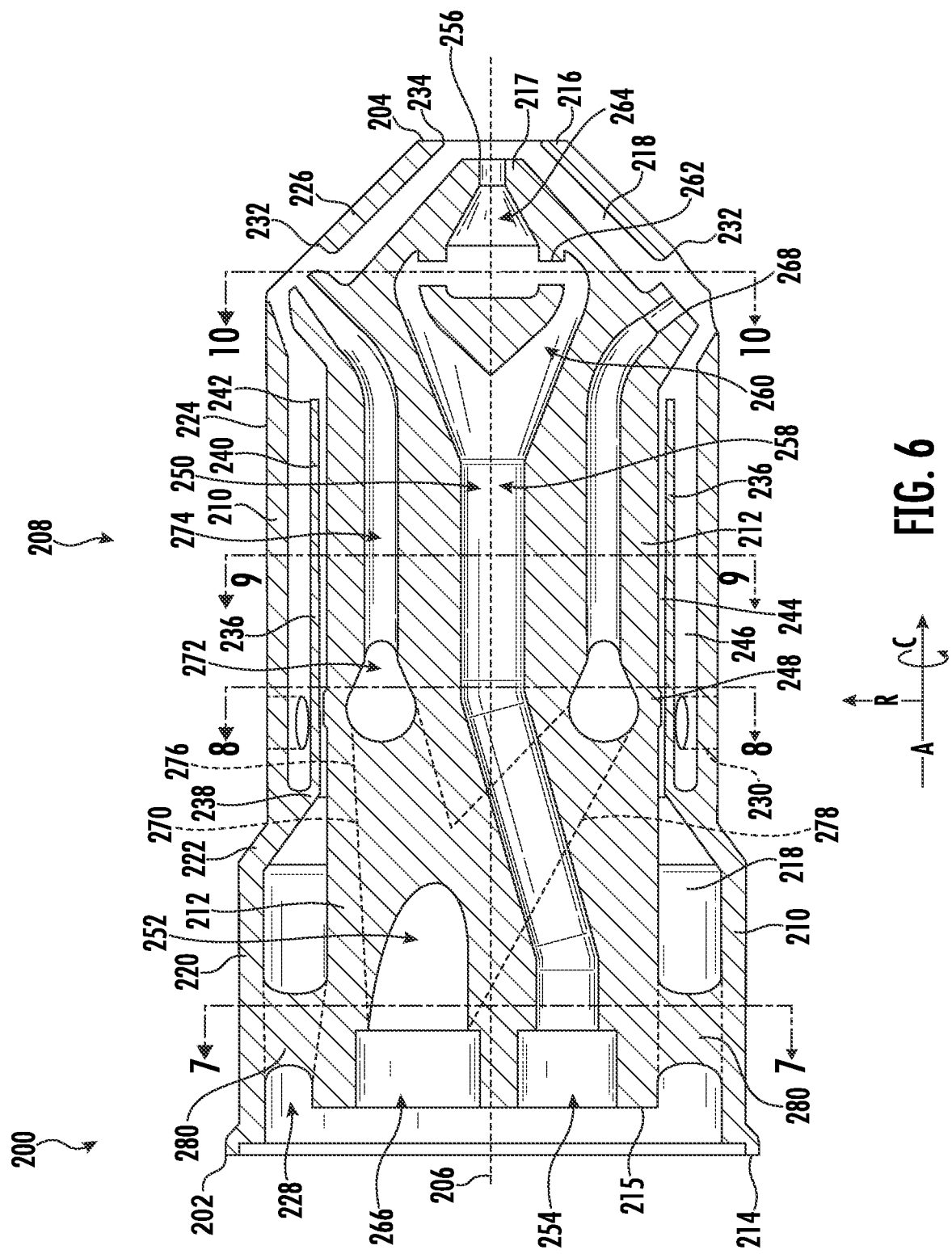
FIG. 6 illustrates a cross-sectional view of the cartridge tip from along the line 6-6 shown in FIG. 5, in accordance with embodiments of the present disclosure.

FIG. 5 illustrates a perspective view of the cartridge tip 200, and FIG. 6 illustrates a cross-sectional view of the cartridge tip 200 from along the line 6-6 shown in FIG. 5, in accordance with embodiments of the present disclosure.

In many embodiments, as shown in FIGS. 5 and 6, the cartridge tip 200 may include a main body 208 extending from the base 202, along the axial centerline 206, to the tip 204. The main body 208 may include an outer annular wall 210 and an inner core 212 each extending between a respective upstream end 214, 215 and a respective downstream end 216, 217.

The cartridge tip 200 may define multiple separate fuel circuits capable of operation together, in any combination, or independently. For example, as discussed below in detail, the cartridge tip 200 may define a pilot fuel circuit 250 and a main fuel circuit 252. Each fuel circuit (e.g., the pilot fuel circuit 250 and the main fuel circuit 252) defined in the cartridge tip 200 may be capable of separately receiving a flow of liquid fuel (such as only liquid fuel or a liquid fuel and water mixture) from the liquid fuel supply 166. Additionally, an annular air passage 218 may supply a flow of purge air through the cartridge tip 200.

In many embodiments, the outer annular wall 210 may generally converge (or taper) radially inward in the axial direction A (or downstream direction). In such embodiments, the outer annular wall 210 may include one or more converging, tapered, or otherwise slanted portions with respect to the axial centerline 206 of the cartridge tip 200.

For example, the outer annular wall 210 may include a first cylindrical portion 220, a converging mid portion 222 (or tapered mid portion) downstream from the first cylindrical portion 220, a second cylindrical portion 224 downstream from the converging mid portion 222, and a converging aft portion 226 (or tapered aft portion) downstream from the second cylindrical portion 224 and upstream from the aft end 216 of the outer annular wall 210. The various portions of the outer annular wall 210 collectively form an aerodynamic profile or contoured exterior surface of the cartridge tip 200. Additionally, the converging portions 222 and 226 advantageously provide both for flow metering and increased mixing within the cartridge tip 200.

In exemplary embodiments, the inner core 212 may be radially spaced apart from the outer annular wall 210 such that an annular air passage 218 is defined at least partially between the outer annular wall 210 and the inner core 212. For example, the annular air passage 218 may circumferentially surround the inner core 212 and be bound between the outer annular wall 210 and the inner core 212. In many embodiments, the annular air passage 218 may extend between the outer annular wall 210 and the inner core 212 for the entire axial length of the cartridge tip 200. In particular, the annular air passage 218 may be directly bound between a radially inner surface of the outer annular wall 210 and a radially outer surface of the inner core 212. In exemplary embodiments, the annular air passage 218 may extend from to each of an annular inlet 228, a first plurality of outlets 230, a second plurality of outlets 232, and a central outlet 234.

As shown, the annular inlet 228 may be defined between the outer annular wall 210 and the inner core 212 at the respective upstream end 215 of the inner core 212. In exemplary embodiments, the first plurality of outlets 230 may be defined within the second cylindrical portion 224 of the outer annular wall 210. In such embodiments, each outlet 230 in the first plurality of outlets 230 may be oriented such that it ejects a discrete jet (or spray) of air generally radially. In other embodiments (not shown), the first plurality of outlets 230 may be defined along any portion of the outer annular wall 210 upstream of the second plurality of outlets 232, such as the first cylindrical portion 220 and/or the converging mid portion 222. In many embodiments, the second plurality of outlets 232 may be defined in one or both of the second cylindrical portion 224 and the converging aft portion 226 of the outer annular wall 210. In various embodiments, the second plurality of outlets 232 may be disposed downstream from the first plurality of outlets 230.

As discussed below in more detail, each outlet 232 in the second plurality of outlets 232 of the annular air passage 218 may be both radially and axially spaced apart from, but may circumferentially align with, a respective outlet 268 of a plurality of main outlets 268 of a main fuel circuit 252 defined within the inner core 212 of the cartridge tip 200. The central outlet 234 may be defined in the converging aft portion 226 of the outer annular wall 210 downstream from the second plurality of outlets 232. For example, the central outlet 234 may be a single, circularly shaped, outlet having a center point along the axial centerline 206 of the cartridge tip 200. In many embodiments, the central outlet 234 may be both the largest outlet of the cartridge tip 200 and the downstream-most outlet of the annular air passage 218.

As shown in in FIG. 6, in exemplary embodiments, the cartridge tip 200 may further include a heat shield 236 that extends radially inward from the outer annular wall into the annular air passage 218. For example, the heat shield 236 may extend annularly from the outer annular wall 210, within the annular air passage, to a free end 242. In various embodiments, the heat shield may include a radially extending portion 238 and an axially extending portion 240. The radially extending portion 238 may extend from the outer annular wall 210 to the axially extending portion 240. The axially extending portion 240 may extend from the radially extending portion 238 to the free end 242. In many embodiments, the axially extending portion 240 of the heat shield 236 may be radially spaced apart from both the outer annular wall (such as an interior surface of the outer annular wall) and the inner core (such as an exterior surface of the inner core), such that the heat shield may at least partially divide the annular air passage 218 into a downstream-flowing portion 244 and an upstream flowing portion 246.

Air within the downstream-flowing portion 244 of the annular air passage 218 may flow in the downstream or axial direction A, and air within the upstream-flowing portion 246 of the annular air passage 218 may flow in the upstream direction (opposite the axial direction A). In exemplary embodiments, the downstream-flowing portion 244 of the annular air passage 218 may be disposed between the heat shield 236 and the outer annular wall 210. The upstream-flowing portion 246 of the annular air passage 218 is disposed between the heat shield 316 and the inner core 212. For example, the annular heat shield 236 may extend within the annular air passage 218 from a coupled end disposed on the outer annular wall 210 to the free end 242 downstream from the coupled end, such that the downstream-flowing portion 244 of the annular air passage 218 extends on a first side of the heat shield 236 and the upstream-flowing portion 246 of the annular air passage 218 extends on a second side of the heat shield 236. In exemplary implementations, the heat shield 236 provides an additional conductive heat transfer path, which advantageously reduces the thermal gradients experienced by the cartridge tip 200 thereby lengthening hardware life.

In many embodiments, the cartridge tip 200 may further include a circumferential rib 248 that extends radially outward from the inner core 212 and into the downstream-flowing portion 244 of the annular air passage 218. The circumferential rib may advantageously prevent a backflow of air within the downstream-flowing portion 244 of the annular air passage 218. The circumferential rib 248 may be disposed axially within the downstream-flowing portion 244 of the annular air passage 218 (e.g., at the axial location of the axial portion 246 of the heat shield 236). In many embodiments, the circumferential rib 248 may have a generally frustoconical shaped cross-sectional shape, such that it advantageously acts as a nozzle (such as a venturi nozzle) that prevents air backflow. For example, the circumferential rib 248 may extend radially from the exterior surface of the inner core 212 towards the heat shield 236 (but may be radially spaced apart from the heat shield 236).

As shown in FIG. 6, the inner core 212 may further define a pilot fuel circuit 250 and a main fuel circuit 252. The pilot fuel circuit 250 may extend between a pilot inlet 254 defined in the upstream end 215 of the inner core 212 and a pilot outlet 256 downstream end 217 of the inner core 212. In many embodiments, the pilot fuel circuit 250 may extend at least partially along the axial centerline 206 of the cartridge tip 200. For example, the pilot fuel circuit 250 may include (e.g., in a serial flow order) an inlet portion 258, an annular portion 260, a plurality of tangential passages 262, and an aft plenum 264.

In exemplary embodiments, the inlet portion 258 may extend from the pilot inlet 254 to the annular portion 260. As shown in FIG. 6, at least a portion of the inlet portion 258 may extend along the axial centerline 206. The plurality of tangential passages 262 may extend between the annular portion 260 and the aft plenum 264. In many embodiments, a protrusion 261 may extend axially into the pilot fuel circuit 250 to form the annular portion 260 of the pilot fuel circuit 250. As discussed below, the plurality of tangential passages 262 may each extend along a radially oriented plane in a direction angled to the radial direction R, such that a swirling flow is produced by the plurality of tangential passages 262 in the aft plenum 264. The aft plenum 264 may generally converge radially as it extends axially from the outlets of the plurality of tangential passages 262 to the pilot outlet 256. As shown, the pilot outlet 256 may be axially spaced apart (e.g., axially inward) of the aft end 216 of the outer annular wall 210.

The main fuel circuit 252 may be defined within inner core 212 of the main body 208. The main fuel circuit 252 may extend between a main inlet 266 in the upstream end 215 of the inner core 212 and a plurality of main outlets 268. The plurality of main outlets 268 may be circumferentially spaced apart from one another and disposed upstream from the pilot outlet 256. For example, the plurality of main outlets 268 may be disposed both radially and axially inward of the second plurality of outlets of the 232. In particular, each main outlet 268 of the plurality of main outlets 268 of the main fuel circuit 252 may be circumferentially aligned (e.g., disposed on a common injection axis) with a respective second outlet 232 of the plurality of second outlets 232 of the annular air passage 218.

In exemplary embodiments, the main fuel circuit 252 may include, in a serial flow order, an inlet portion 270, an annular plenum 272, and a plurality of circumferentially spaced passages 274. The inlet portion 270 may extend from the main inlet 266 and include a first branch 276 and a second branch 278. In many embodiments, the inlet portion 270 may extend between the main inlet 266 and the annular plenum 272. In particular, the annular plenum 272 may fluidly coupled to the first branch 276 and the second branch 278 of the inlet portion 270. In this way, the inlet portion 270 may supply a flow of fuel to the annular plenum 272 via both the first branch 276 and the second branch 278, which advantageously uniformly distributes the fuel within the annular plenum 272. In particular, the outlet of the first branch 276 and the second branch 278 may be disposed opposite from one another in the annular plenum 272 to uniformly distribute fuel. The plurality of circumferentially spaced passages 274 may each extend from the annular plenum 272 to a respective main outlet 268 of the plurality of main outlets 268. The plurality of circumferentially spaced passages 274 may extend generally axially from the annular plenum 272 towards the plurality of main outlets 268.

Figure 7:
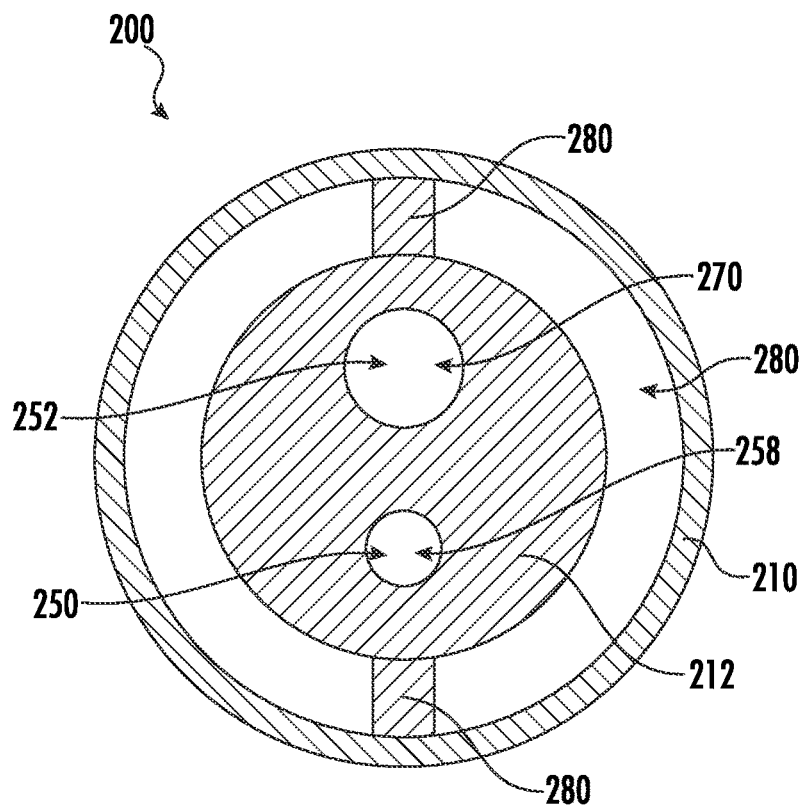
FIG. 7 illustrates a cross-sectional view of the cartridge tip from along the line 7-7 shown in FIG. 6, in accordance with embodiments of the present disclosure.
Figure 8:
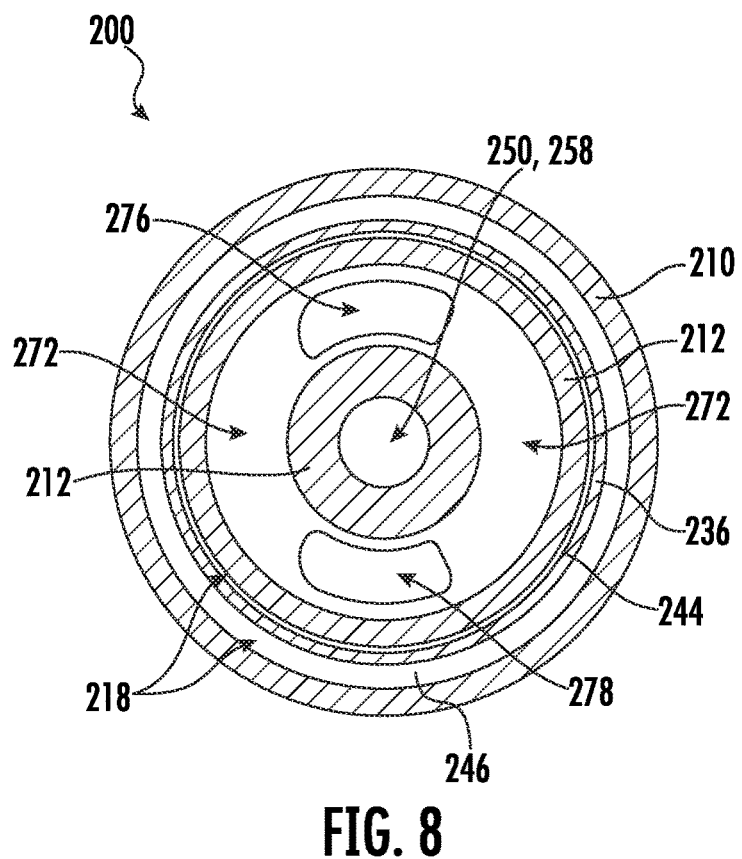
FIG. 8 illustrates a cross-sectional view of the cartridge tip from along the line 8-8 shown in FIG. 6, in accordance with embodiments of the present disclosure.
Figure 9:
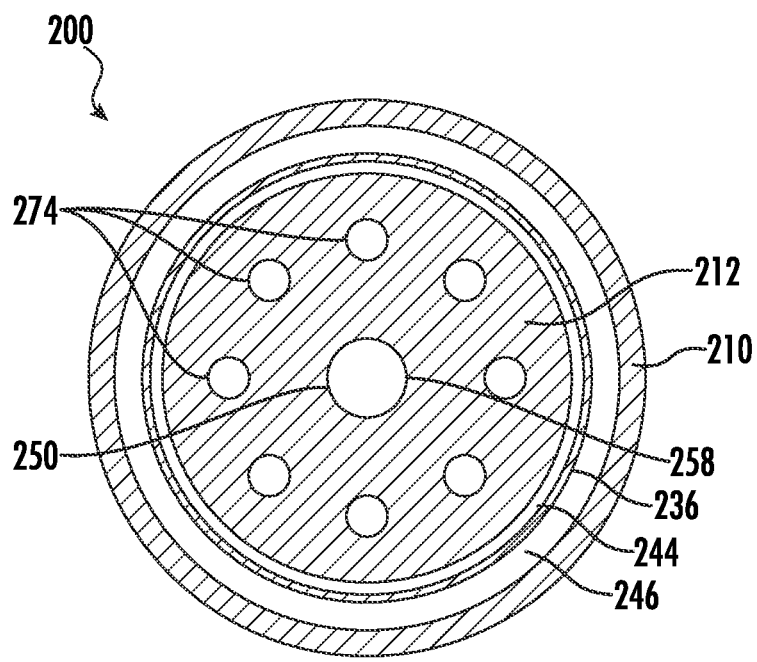
FIG. 9 illustrates a cross-sectional view of the cartridge tip from along the line 9-9 shown in FIG. 6, in accordance with embodiments of the present disclosure.
Figure 10:
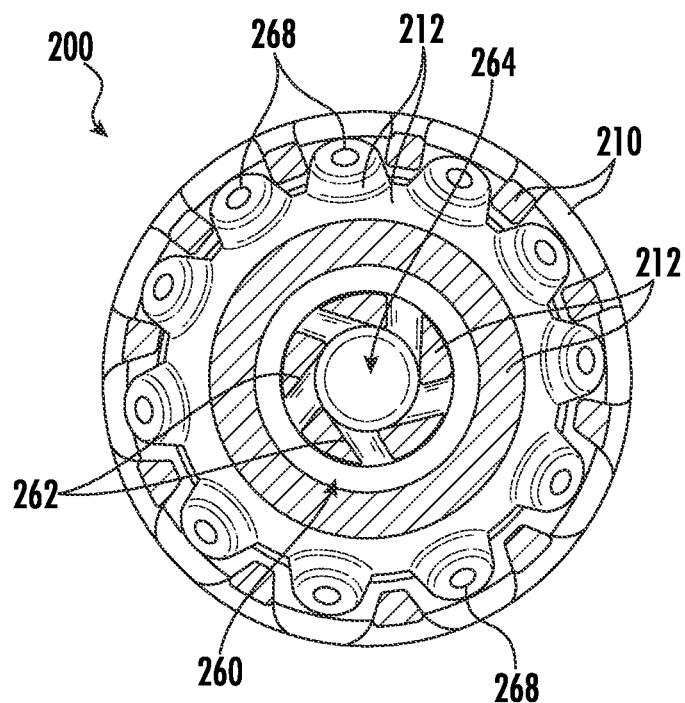
FIG. 10 illustrates a cross-sectional view of the cartridge tip from along the line 10-10 shown in FIG. 6, in accordance with embodiments of the present disclosure.

FIGS. 7-10 illustrate different cross-sectional views of the cartridge tip 200 from along various positions of the axial centerline 206, as indicated by the cross-section lines in FIG. 6. For example, FIG. 7 illustrates a cross-sectional view of the cartridge tip 200 from along the line 7-7 shown in FIG. 6. FIG. 8 illustrates a cross-sectional view of the cartridge tip 200 from along the line 8-8 shown in FIG. 6. FIG. 9 illustrates a cross-sectional view of the cartridge tip 200 from along the line 9-9 shown in FIG. 6. FIG. 10 illustrates a cross-sectional view of the cartridge tip 200 from along the line 10-10 shown in FIG. 6.

As shown in FIGS. 6 and 7, the cartridge tip 200 may include one or more struts 280 that couple the outer annular wall 210 to the inner core 212. In exemplary embodiments, the cartridge tip 200 may only include two struts 280 diametrically opposed to one another (e.g., about 180° apart in the circumferential direction C) and extending radially from the outer annular wall 210 to the inner core 212. However, in other embodiments, the cartridge tip 200 may include any number of struts 280 (such as 1, 3, 4, 5, 6, up to 10 or more) and should not be limited to any specific number of struts 280 unless specifically recited in the claims. In many embodiments, the one or more struts 280 may be disposed in the annular air passage 218 immediately downstream from the annular inlet 228, such that the struts 210 are proximate the upstream end of the cartridge tip 200. In exemplary embodiments, outer annular wall 210 may couple to the inner core 212 only by the one or more struts 280, such that the inner core is rigidly suspended within the outer annular wall 210 by the one or more struts 280.

As shown in FIGS. 6 and 8, the annular air passage 218 may be disposed radially outward from both the pilot fuel circuit 250 and the main fuel circuit 252. Additionally, in many embodiments, the annular plenum 272 of the main fuel circuit 252 may surround the pilot fuel circuit 250. In particular, the annular plenum 272 of the main fuel circuit 252 may entirely circumferentially surround the inlet portion 258 of the pilot fuel circuit 250. In exemplary embodiments, as shown, the first branch 276 and the second branch 278 of the main fuel circuit 252 may each separately fluidly couple to the annular plenum 272. For example, the first branch 276 and the second branch 278 may fluidly couple to the annular plenum 272 on opposite sides (e.g., diametrically opposed to one another) of the pilot fuel circuit 250, thereby equally distributing fuel to the annular plenum 272 during operation for higher combustion efficiency.

As shown in FIGS. 6 and 9, the plurality of circumferentially spaced passages 274 may each extend from the annular plenum 272 to a respective main outlet 268 of the plurality of main outlets 268. The plurality of circumferentially spaced passages 274 may extend generally axially from the annular plenum 272 towards the plurality of main outlets 268. In exemplary embodiments, each circumferentially spaced passage 274 of the plurality of circumferentially spaced passages 274 may be operable to eject a discrete flow of fuel into the combustor 17 during operation thereof. Each of the plurality of circumferentially spaced passages 274 may be disposed radially outward from the pilot fuel circuit 250 and may extend generally axially through the inner core 212. Although FIG. 9 illustrates an embodiment of a cartridge tip 200 having eight circumferentially spaced passages 274, the cartridge tip 200 may include any number of circumferentially spaced passages (such as 1, 2, 3, 4, 5 or up to 15 or more).

The cartridge tip 200 may advantageously have a more solid structure as compared to prior designs, which favorably increases the amount of conductive heat transfer paths and minimizes high thermal stress zones within the cartridge tip 200. For example, the amount of material (e.g., metal) used to form the cartridge tip may be expressed by a ratio between material volume (e.g., the amount of physical material present in the cartridge tip 200 component) and total part volume (e.g., the total volume of the cartridge tip 200 calculated using an exterior profile of the cartridge tip 200). In particular, the ratio of material volume to total volume may be between about 0.5 and about 0.9, such as between about 0.6 and about 0.8, such as about 0.7.

As shown in FIGS. 6 and 10, each tangential passage of the plurality of tangential passages 262 may extends from the annular portion 260 to the aft plenum 264. In exemplary embodiments, each of the tangential passages 262 of the plurality of tangential passages 262 extend at least partially tangentially from the aft plenum 264 along a radial plane such that the plurality of tangential passages 262 is operable to induce a swirling flow of fuel within the aft plenum 264 upstream from the pilot outlet 256. For example, the cross-sectional shape of the aft plenum 264 may be generally circular, and each of the tangential passages 262 may extend at least partially tangentially from the circular shape of the aft plenum 264. In other words, each of the tangential passages may extend along a radial plane in a direction angled, sloped, and/or slanted with respect to the radial direction R. In this way, the tangential passages 262 advantageously produce a swirling flow of fuel within the aft plenum 264 during operation of the cartridge tip 200, thereby resulting in a more complete combustion of the fuel within the combustion chamber.

In many embodiments, the cartridge tip 200 may be integrally formed. For example, the cartridge tip 200 described herein may be integrally formed as a single component. That is, each of the subcomponents, e.g., the outer annular wall 210, the inner core 212, and all of the various voids, gaps and passages, may be manufactured together as a single body. In exemplary embodiments, this may be done by utilizing an additive manufacturing system and method, such as direct metal laser sintering (DMLS), direct metal laser melting (DMLM), or other suitable additive manufacturing techniques. In other embodiments, other manufacturing techniques, such as casting or other suitable techniques, may be used. In this regard, by utilizing additive manufacturing methods, the cartridge tip 200 may be integrally formed as a single piece of continuous metal and may thus include fewer sub-components and/or joints compared to prior designs. The integral formation of the cartridge tip 200 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced. Further, the integral formation of the cartridge tip 200 may favorably reduce the weight of the cartridge tip 200 as compared to other manufacturing methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A cartridge tip comprising a main body comprising an outer annular wall and an inner core each extending between a respective upstream end and a respective downstream end, the inner core radially spaced apart from the outer annular wall such that an annular air passage is defined at least partially between the outer annular wall and the inner core; a pilot fuel circuit defined in the inner core of the main body, the pilot fuel circuit extending between a pilot inlet defined in the upstream end of the inner core and a pilot outlet defined in the downstream end of the inner core, wherein the pilot fuel circuit extends at least partially along an axial centerline of the cartridge tip; and a main fuel circuit defined in the inner core of the main body, the main fuel circuit extending between a main inlet in the upstream end of the inner core and a plurality of main outlets circumferentially spaced apart from one another and disposed upstream from the pilot outlet.

The cartridge tip of one or more of these clauses, wherein the main fuel circuit includes in a serial flow order an inlet portion extending from the main inlet and having a first branch and a second branch, an annular plenum fluidly coupled to the first branch and the second branch of the inlet portion, and a plurality of circumferentially spaced passages each extending from the annular plenum to a respective main outlet of the plurality of main outlets.

The cartridge tip of one or more of these clauses, wherein the annular plenum of the main fuel circuit surrounds the pilot fuel circuit.

The cartridge tip of one or more of these clauses, wherein the pilot fuel circuit includes in a serial flow order an inlet portion extending from the pilot inlet, an annular portion, a plurality of tangential passages, and an aft plenum extending to the pilot outlet.

The cartridge tip of one or more of these clauses, wherein each tangential passage of the plurality of tangential passages extends from the annular portion to the aft plenum, and wherein each of the tangential passages of the plurality of tangential passages extends at least partially tangentially from the aft plenum along a radial plane such that the plurality of tangential passages is operable to induce a swirling flow of fuel within the aft plenum upstream from the pilot outlet.

The cartridge tip of one or more of these clauses, wherein the outer annular wall includes a cylindrical portion and a converging aft portion downstream from the cylindrical portion and upstream from the aft end of the outer annular wall.

The cartridge tip of one or more of these clauses, wherein the annular air passage extends from an annular inlet to each of a first plurality of outlets, a second plurality of outlets, and a central outlet.

The cartridge tip of one or more of these clauses, wherein the annular inlet is defined between the outer annular wall and the inner core at the respective upstream end of the inner core, wherein the first plurality of outlets is defined in the cylindrical portion of the outer annular wall, wherein the second plurality of outlets is at least partially defined in the converging aft portion of the outer annular wall downstream from the first plurality of outlets, and wherein the central outlet is defined in the converging aft portion of the outer annular wall downstream from the second plurality of outlets.

The cartridge tip of one or more of these clauses, wherein one or more struts couple the outer annular wall to the inner core.

The cartridge tip of one or more of these clauses, wherein the cartridge tip is integrally formed.

The cartridge tip of one or more of these clauses, wherein the annular air passage is disposed radially outward from both the pilot fuel circuit and the main fuel circuit.

The cartridge tip of one or more of these clauses, wherein an annular heat shield extends from the outer annular wall within the annular air passage to a free end, wherein a downstream-flowing portion of the annular air passage is disposed between the heat shield and the inner core, and wherein an upstream-flowing portion of the annular air passage is disposed between the heat shield and the outer annular wall.

The cartridge tip of one or more of these clauses, wherein a circumferential rib extends radially outward from the inner core and into the downstream-flowing portion of the annular air passage.

A combustor comprising an end cover; a combustion liner defining a combustion chamber; a plurality of fuel nozzles extending between the end cover and the combustion liner; and at least one liquid fuel cartridge extending through a fuel nozzle of the plurality of fuel nozzles to a cartridge tip, the cartridge tip comprising a main body comprising an outer annular wall and an inner core each extending between a respective upstream end and a respective downstream end, the inner core radially spaced apart from the outer annular wall such that an annular air passage is defined at least partially between the outer annular wall and the inner core; a pilot fuel circuit defined in the inner core of the main body, the pilot fuel circuit extending between a pilot inlet defined in the upstream end of the inner core and a pilot outlet defined in a downstream end of the inner core, wherein the pilot fuel circuit extends at least partially along an axial centerline of the cartridge tip; and a main fuel circuit defined in the inner core of the main body, the main fuel circuit extending between a main inlet in the upstream end of the inner core and a plurality of main outlets circumferentially spaced apart from one another and disposed upstream from the pilot outlet.

The combustor of one or more of these clauses, wherein the main fuel circuit includes in a serial flow order an inlet portion extending from the main inlet and having a first branch and a second branch, a annular plenum fluidly coupled to the first branch and the second branch of the inlet portion, and a plurality of circumferentially spaced passages each extending from the annular plenum to a respective main outlet of the plurality of main outlets.

The combustor of one or more of these clauses, wherein the annular plenum of the main fuel circuit surrounds the pilot fuel circuit.

The combustor of one or more of these clauses, wherein the pilot fuel circuit includes in a serial flow order an inlet portion extending from the pilot inlet, an annular portion, a plurality of tangential passages, and an aft plenum extending to the pilot outlet.

The combustor of one or more of these clauses, wherein each tangential passage of the plurality of tangential passages extends from the annular portion to the aft plenum, and wherein each of the tangential passages of the plurality of tangential passages extend at least partially tangentially from the aft plenum along a radial plane such that the plurality of tangential passages is operable to induce a swirling flow of fuel within the aft plenum upstream from the pilot outlet.

The combustor of one or more of these clauses, wherein the outer annular wall includes a cylindrical portion and a converging aft portion downstream from the cylindrical portion and upstream from the aft end of the outer annular wall.

The combustor of one or more of these clauses, wherein the annular air passage extends from an annular inlet to each of a first plurality of outlets, a second plurality of outlets, and a central outlet, wherein the annular inlet is defined between the outer annular wall and the inner core at a forward end of the inner core, wherein the first plurality of outlets is defined within the cylindrical portion of the outer annular wall, wherein the second plurality of outlets is defined in the converging aft portion of the outer annular wall, downstream from the first plurality of outlets, and wherein the central outlet is defined in the converging aft portion of the outer annular wall downstream from the second plurality of outlets.

What is claimed is:

1. A cartridge tip comprising:
a main body comprising an outer annular wall and an inner core each extending between a respective upstream end and a respective downstream end, the inner core radially spaced apart from the outer annular wall such that an annular air passage is defined at least partially between the outer annular wall and the inner core,
wherein one or more struts couple the outer annular wall to the inner core, an annular heat shield includes a first end coupled to the outer annular wall within the annular air passage downstream of the one or more struts, the annular heat shield extends axially from the first end to a free end within the annular air passage, a circumferential rib extends radially outward from the inner core and terminates within the annular air passage with the circumferential rib radially spaced apart from the annular heat shield within the annular air passage, wherein the circumferential rib is disposed downstream of the first end;
a pilot fuel circuit defined in the inner core of the main body, the pilot fuel circuit extending between a pilot inlet defined in the upstream end of the inner core and a pilot outlet defined in the downstream end of the inner core, wherein the pilot fuel circuit extends at least partially along an axial centerline of the cartridge tip, and wherein the pilot fuel circuit includes a pilot inlet portion extending from the pilot inlet; and
a main fuel circuit defined in the inner core of the main body, the main fuel circuit extending between a main inlet in the upstream end of the inner core and a plurality of main outlets circumferentially spaced apart from one another and disposed upstream from the pilot outlet, the main fuel circuit including an annular plenum surrounding the pilot inlet portion of the pilot fuel circuit.

2. The cartridge tip of claim 1, wherein the main fuel circuit includes in a serial flow order a main inlet portion extending from the main inlet and having a first branch and a second branch, the annular plenum fluidly coupled to the first branch and the second branch of the main inlet portion, and a plurality of circumferentially spaced passages each extending from the annular plenum to a respective main outlet of the plurality of main outlets.

3. The cartridge tip of claim 1, wherein the pilot fuel circuit includes in a serial flow order the pilot inlet portion extending from the pilot inlet, an annular portion, a plurality of tangential passages, and an aft plenum extending to the pilot outlet.

4. The cartridge tip of claim 3, wherein each tangential passage of the plurality of tangential passages extends from the annular portion to the aft plenum, and wherein each of the tangential passages of the plurality of tangential passages extends at least partially tangentially from the aft plenum along a radial plane such that the plurality of tangential passages is operable to induce a swirling flow of fuel within the aft plenum upstream from the pilot outlet.

5. The cartridge tip of claim 1, wherein the outer annular wall includes a cylindrical portion and a converging aft portion downstream from the cylindrical portion and upstream from an aft end of the outer annular wall.

6. The cartridge tip of claim 5, wherein the annular air passage extends from an annular inlet to each of a first plurality of outlets, a second plurality of outlets, and a central outlet.

7. The cartridge tip of claim 6, wherein the annular inlet is defined between the outer annular wall and the inner core at the respective upstream end of the inner core, wherein the first plurality of outlets is defined in the cylindrical portion of the outer annular wall, wherein the second plurality of outlets is at least partially defined in the converging aft portion of the outer annular wall downstream from the first plurality of outlets, and wherein the central outlet is defined in the converging aft portion of the outer annular wall downstream from the second plurality of outlets.

8. The cartridge tip of claim 1, wherein the one or more struts include a first strut and a second strut diametrically opposed to one another, and wherein the first strut and the second strut are each disposed in the annular air passage immediately downstream from an annular inlet.

9. The cartridge tip of claim 1, wherein the cartridge tip is integrally formed.

10. The cartridge tip of claim 1, wherein the annular air passage is disposed radially outward from both the pilot fuel circuit and the main fuel circuit.

11. The cartridge tip of claim 1, wherein a downstream-flowing portion of the annular air passage is disposed between the annular heat shield and the inner core, and wherein an upstream-flowing portion of the annular air passage is disposed between the annular heat shield and the outer annular wall.

12. The cartridge tip of claim 11, wherein the circumferential rib terminates within the downstream-flowing portion of the annular air passage, wherein the circumferential rib is disposed closer to the first end of the annular heat shield than the free end of the annular heat shield, and wherein the circumferential rib has a frustoconical cross-sectional shape.

13. A combustor comprising:
an end cover;
a combustion liner defining a combustion chamber;
a plurality of fuel nozzles extending between the end cover and the combustion liner; and
at least one liquid fuel cartridge extending through a fuel nozzle of the plurality of fuel nozzles to a cartridge tip, the cartridge tip comprising:
a main body comprising an outer annular wall and an inner core each extending between a respective upstream end and a respective downstream end, the inner core radially spaced apart from the outer annular wall such that an annular air passage is defined at least partially between the outer annular wall and the inner core,
wherein one or more struts couple the outer annular wall to the inner core, an annular heat shield includes a first end coupled to the outer annular wall within the annular air passage downstream of the one or more struts, the annular heat shield extends axially from the first end to a free end within the annular air passage, a circumferential rib extends radially outward from the inner core and terminates within the annular air passage with the circumferential rib radially spaced apart from the annular heat shield within the annular air passage, wherein the circumferential rib is disposed downstream of the first end;
a pilot fuel circuit defined in the inner core of the main body, the pilot fuel circuit extending between a pilot inlet defined in the upstream end of the inner core and a pilot outlet defined in the downstream end of the inner core, wherein the pilot fuel circuit extends at least partially along an axial centerline of the cartridge tip, and wherein the pilot fuel circuit includes a pilot inlet portion extending from the pilot inlet; and
a main fuel circuit defined in the inner core of the main body, the main fuel circuit extending between a main inlet in the upstream end of the inner core and a plurality of main outlets circumferentially spaced apart from one another and disposed upstream from the pilot outlet, the main fuel circuit including an annular plenum surrounding the pilot inlet portion of the pilot fuel circuit.

14. The combustor of claim 13, wherein the main fuel circuit includes in a serial flow order a main inlet portion extending from the main inlet and having a first branch and a second branch, the annular plenum fluidly coupled to the first branch and the second branch of the main inlet portion, and a plurality of circumferentially spaced passages each extending from the annular plenum to a respective main outlet of the plurality of main outlets.

15. The combustor of claim 13, wherein the pilot fuel circuit includes in a serial flow order the pilot inlet portion extending from the pilot inlet, an annular portion, a plurality of tangential passages, and an aft plenum extending to the pilot outlet.

16. The combustor of claim 15, wherein each tangential passage of the plurality of tangential passages extends from the annular portion to the aft plenum, and wherein each of the tangential passages of the plurality of tangential passages extend at least partially tangentially from the aft plenum along a radial plane such that the plurality of tangential passages is operable to induce a swirling flow of fuel within the aft plenum upstream from the pilot outlet.

17. The combustor of claim 13, wherein the outer annular wall includes a cylindrical portion and a converging aft portion downstream from the cylindrical portion and upstream from an aft end of the outer annular wall.

18. The combustor of claim 17, wherein the annular air passage extends from an annular inlet to each of a first plurality of outlets, a second plurality of outlets, and a central outlet, wherein the annular inlet is defined between the outer annular wall and the inner core at a forward end of the inner core, wherein the first plurality of outlets is defined within the cylindrical portion of the outer annular wall, wherein the second plurality of outlets is defined in the converging aft portion of the outer annular wall downstream from the first plurality of outlets, and wherein the central outlet is defined in the converging aft portion of the outer annular wall downstream from the second plurality of outlets.

* * * * *